Nov. 24, 1942.  W. R. TUCKER  2,302,922
VARIABLE DELIVERY PILOT PUMP CONTROL SYSTEM
Filed Jan. 4, 1940  5 Sheets-Sheet 1

FIG.1.

Inventor
WARREN R. TUCKER,
By
Toulmin & Toulmin
Attorneys

Nov. 24, 1942.  W. R. TUCKER  2,302,922
VARIABLE DELIVERY PILOT PUMP CONTROL SYSTEM
Filed Jan. 4, 1940  5 Sheets—Sheet 2

INVENTOR.
Warren R. Tucker
BY
Toulmin & Toulmin
ATTORNEYS

Nov. 24, 1942.          W. R. TUCKER          2,302,922
VARIABLE DELIVERY PILOT PUMP CONTROL SYSTEM
Filed Jan. 4, 1940          5 Sheets-Sheet 5

INVENTOR
WARREN R. TUCKER
BY
Toulmin & Toulmin
ATTORNEYS

Patented Nov. 24, 1942

2,302,922

UNITED STATES PATENT OFFICE 2,302,922

VARIABLE DELIVERY PILOT PUMP CONTROL SYSTEM

Warren R. Tucker, Dayton, Ohio, assignor to The Hydraulic Development Corp. Inc., Wilmington, Del., a corporation of Delaware Application January 4, 1940, Serial No. 312,392

15 Claims. (Cl. 103—38)

This invention relates to a hydraulic system and more particularly to a hydraulic system wherein the servomotor or servomotors of a main variable delivery pump, the output of which is employed to motivate a main hydraulic motor, is controlled by a variable delivery pilot pump. Heretofore, hydraulic systems of this type employing a servomotor have utilized pilot pressure supplied by a small constant delivery pump which is unloaded through a relief or unloading valve after the shifting of the shift ring of the main pump has been accomplished by the servomotor.

The principal object of the present invention is to eliminate all bypassing of hydraulic medium supplied by the pilot pump and also to give a variable speed of shifting the main pump; primarily this object is accomplished by using a small variable delivery pilot pump for actuating the servomotor of the main pump; as a result, the servomotor of the main pump is varied or shifted by varying or reversing the output of the pilot pump, and after shifting of the servomotor of the main pump has been effected, the pilot pump is shifted to neutral whereby the necessity for using a relief or unloading valve is eliminated.

It is another object to eliminate the power loss and heating of the hydraulic medium attendant upon the use of a relief or unloading valve by eliminating the necessity for using such a valve and providing for shifting of the pilot pump to neutral.

Another object is to provide a closed circuit pilot system by utilizing a reversible delivery pilot pump.

Another object is to provide electrical means for directly controlling the delivery of the pilot pump whereby the pilot pump is automatically so controlled that the main hydraulic motor is actuated in the desired manner.

Another object is to provide means for automatically centering the shift ring of the main pump when it is desired to stop the motion of the main hydraulic motor and in a preferred embodiment, means for automatically shifting the pilot pump to neutral when the motion of the main hydraulic motor has been completed.

Another object is to provide a novel shuttle valve which is constructed so as to automatically allow the main pump to self-center after the pilot pump has been shifted to neutral by some outside means.

Still other objects will more fully hereinafter appear.

*General arrangement*

In general, the present invention contemplates the application of a variable delivery pilot pump in place of the constant delivery pilot pump heretofore employed for control of the output of a main pump which is used in any desired manner, as for example for actuating the ram of a pressing hydraulic motor. In a preferred form, a reversible variable delivery pilot pump is employed for this type of service. The pilot pump is adapted to have its output controlled either mechanically as by some outside means such as the motion of the pressing platen or manually operated shifting means, or hydraulically by the attainment of a predetermined pressure in the output of the pilot pump after the shifting of the main pump has been accomplished. Desirably, means is provided for automatically short-circuiting the output of the pilot pump so as to allow the main pump to automatically shift to neutral when the pilot pump has been shifted positively to neutral, this being accomplished by the provision of a special type of shuttle valve in the output of the pilot pump. It is also desirable to provide for automatically self-centering the shift ring of the main pump when the pilot pump has been shifted to neutral by some outside means. These generalities will be more fully understood as the following description of several hydraulic circuits embodying the principles of the present invention proceeds.

Figure 1:
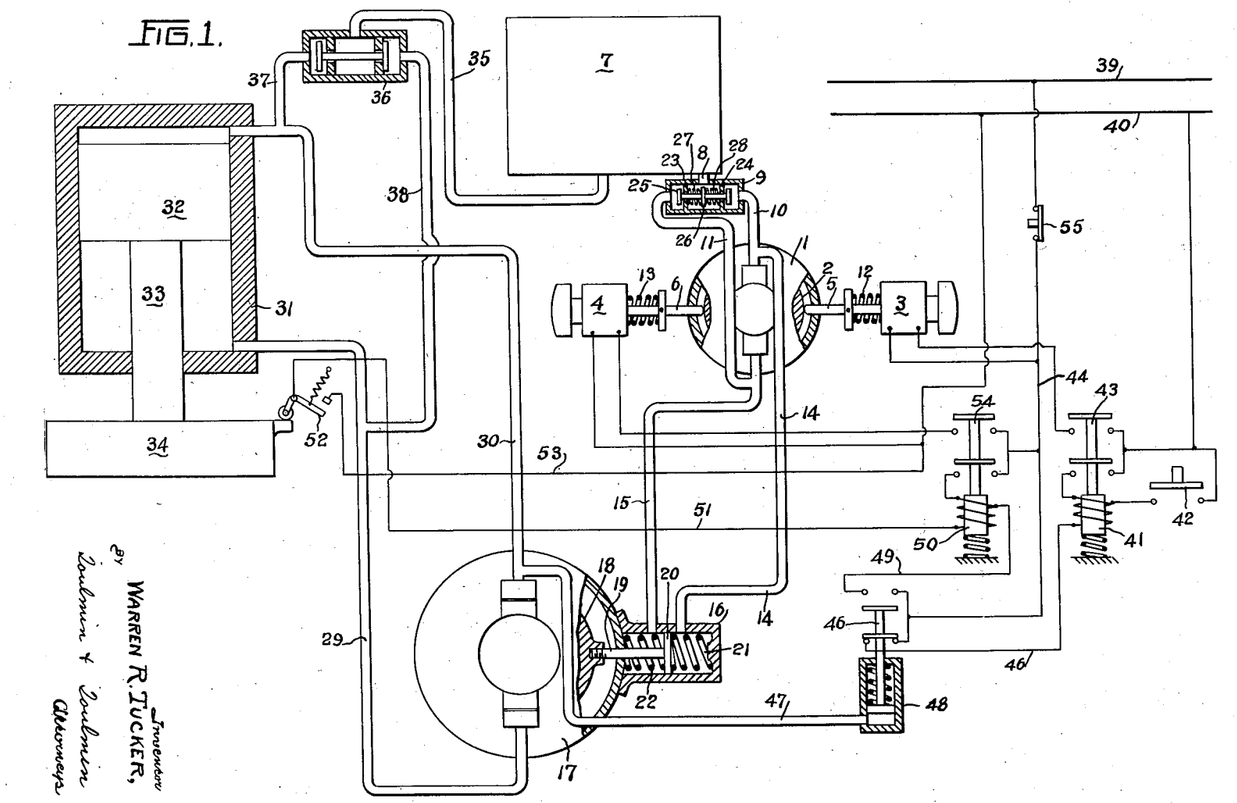
Fig. 1 is a diagrammatic view of the complete hydraulic and electrical circuit of a hydraulic system wherein a solenoid-operated pilot pump delivers variable pilot pressure to actuate the servomotor of the main hydraulic pump and to thereby shift the shift ring thereof and control the direction of delivery thereof.

*Embodiment of Figure 1*

The pilot pump 1 is of the reversible variable delivery type. This pump has a shift ring 2 which is adapted to reverse or vary the delivery thereof. A solenoid 3 is provided for shifting the shift ring to the left and a solenoid 4 is likewise provided on the opposite side of the pump for shifting the shift ring to the right, this shifting being accomplished by the shift rods 5 and 6 which are fixedly carried in any suitable manner by the armatures of the solenoids 3 and 4. A compression spring 12 associated with the shift rod 5 is compressed when solenoid 4 moves the shift ring to the right and a corresponding spring 13 associated with shift rod 6 is compressed when the solenoid 3 moves the shift ring 2 to the left. Springs 12 and 13 move the shift ring 2 into the central or neutral position whenever the solenoids 3 and 4 are deenergized.

The main tank 7 is connected by a line 8 to the shuttle valve 9 which is of a special type, the shuttle valve 9 being connected by the line 10 to the upper inlet or outlet of the pilot pump 1, and by a line 11 to the bottom inlet or outlet of the pump 1. A line 14 connects the line 10 to a main pump servomotor 16 while a line 15 connects the line 11 to the other side of the servomotor 16. The servomotor 16 is adapted to shift the shift ring 18 of the main pump 17 by means of piston 20 which is connected to the shift ring 18 through shift rod 19 which is integral with piston 20 and which is threadedly received in one side of shift ring 18. A pair of oppositely disposed compression springs 21 and 22 are mounted within the cylinder of the servomotor 16 and act on opposite sides of the servomotor piston 20 to center the shift ring 18 whenever the pressures in lines 14 and 15 are equal and atmospheric.

The shuttle valve 9 comprises a cylindrical casing divided into three compartments which are separated by partitions 23 and 24 which have openings therethrough adapted to place either of the end compartments into communication with the middle compartment. The middle compartment is connected to the inlet line 8 while the end compartments are connected respectively to lines 10 and 11 leading to the pilot pump 1. A valve member 25 having spaced valving heads within the end compartments is adapted to be moved by pressure in an end compartment so as to shut off the end compartment and simultaneously place the other end compartment into free communication with the central compartment. The shuttle valve 9 is generally of the construction shown as elements 16 to 21 in Ernst Patent No. 1,653,350, but has in addition the centrally located shoulder 26 which is adapted to be engaged by compression springs 27 and 28 and to thus move the valve member 25 normally to the middle whereby free communication is established between conduits 10 and 11 for a purpose which will hereinafter appear.

One side of the main pump 17 is connected by a line 29 to the bottom of a hydraulic cylinder 31 while the other side of pump 17 is connected by a line 30 to the top of cylinder 31. Operating within cylinder 31 is the main hydraulic piston 32 connected by the piston rod 33 to the press platen 34. The pump 17 is adapted to be supplied with liquid from tank 7 to make up for any leakage occurring in its circuit or to compensate for the differences in effective area between the top and bottom of piston 32 by a line 35 which connects tank 7 to a shuttle valve 36, shuttle valve 36 being connected by line 37 to the line 30 and by line 38 to the line 29.

The electrical circuit of Fig. 1 is as follows:

The incoming power lines are designated 39 and 40. A manually operable switch 42 is adapted to establish a circuit through a solenoid 41 which causes the armature of solenoid 41 to establish a circuit through to the solenoid 3 and back to the power line 39 by a line 44, at the same time establishing a holding circuit for the armature 43 through tonnage switch 46 to the line 44. The tonnage switch 46 is normally in the position shown but when a predetermined pressure arises in conduit 30 towards the end of the pressing operation, this pressure is conveyed through a conduit 47 to the tonnage hydraulic motor 48 operating the tonnage switch 46 so as to break the holding circuit thus established and simultaneously make a circuit between line 44 and a line 49 across the coil of a solenoid 50, through a line 51, a limit switch 52 which is closed except when the platen 34 is in its uppermost position and a line 53 back to the power line 40 and at the same time establish a holding circuit by means of the lower blade carried by the armature 54 of the solenoid 50. Simultaneously, the upper blade of armature 54 of solenoid 50 establishes a circuit from line 44 through the solenoid 4 back to the line 40 by way of line 53.

An emergency switch 55 is provided in line 44 for breaking any circuit which may be established either through solenoid 41 or 50 for thereby allowing pump 1 to be shifted to neutral by the springs 12 and 13 for thereby allowing pump 17 to be shifted to neutral by the springs 21 and 22 for thereby stopping the platen 34 in its movement, regardless of in which direction this movement may be.

*Operation of the system of Figure 1*

With the mechanism as shown in Fig. 1, in order to cause the platen 34 to lower, the operator manually closes switch 42, causing the armature 43 of the solenoid 41 to lower and to establish a holding circuit through the lower switch blade of the tonnage switch 46 and to energize solenoid 3, causing the pilot pump shift rod 5 to be moved leftwardly against the action of the spring 13.

Thereupon, the pilot pump 1 is placed on stroke in a direction such as to draw liquid from conduit 15 and to supply liquid under pressure to conduit 14, causing the shift ring 18 of the main pump to be shifted leftwardly, causing the main pump 17 to deliver liquid under pressure through conduit 30 to the space above the main pressing piston 32 and to withdraw liquid through conduit 29 from the space below piston 32. As piston 32 is thus lowered, the additional liquid required by pump 17 is withdrawn from the tank 7 by means of the operation of shuttle valve 36. Immediately when the platen 34 begins to lower, the limit switch 52 is closed, placing the circuit in condition for the energizing of solenoid 50.

When pilot pump 1 has delivered sufficient liquid under pressure to effect the shifting of the ring 18 of pump 17, the shifting piston 20 will have moved by the port of the return conduit 15. Continued operation of pilot pump 1 will cause the piston 20 to hold this position. Should piston 20 slip rightwardly so as to seal the port of conduit 15, the liquid pressure supplied by conduit 14 would immediately cause piston 20 to move leftwardly, thus holding the pump 17 on stroke in a direction to deliver into conduit 30.

When the platen has effected the pressing operation, the pressure in conduit 30 will increase to such an extent that the pressure transmitted to tonnage motor 48 will be sufficient to overcome the force of its spring and to force the switch-carrying member 46 upwardly, thereby breaking the circuit through solenoid 41 and thereby de-energizing the solenoid 3. At the same time, the upper switch blade of member 46 will establish a circuit through solenoid 50 which will establish a holding circuit by the lower blade of armature 54 and a circuit through solenoid 4 by its upper blade. This energization of solenoid 4 will cause the rod 6 to move the shift ring 2 of the pilot pump past the neutral position onto stroke in the opposite direction, spring 12 being compressed as this occurs. This will cause pilot pump 1 to deliver liquid under pressure into conduit 15 and to withdraw liquid from conduit 14. As the pump 1 passed through the neutral position, the pressure in line 14 was reduced to atmospheric and this caused the shift piston 20 to move rightwardly of the port of conduit 15. Thus, as liquid under pressure is supplied to conduit 15 it forces shift piston 20 rightwardly of the port of conduit 14 and causes main pump 17 to be placed on stroke in the opposite direction, delivering liquid under pressure to conduit 29 and withdrawing liquid from the space above piston 32 through conduit 30. The excess liquid squeezed out of the space above piston 32 is returned to the tank 7 by the shuttle valve 36. The operation of shuttle valve 36 will be obvious to those skilled in the art, particularly in the light of the Ernst Patent 1,653,350 referred to above.

Under the influence of the pressure liquid in conduit 29, the platen 34 will thus rise until it engages the limit switch 52, causing the circuit established thereby through solenoid 50 to be broken and simultaneously causing the circuit through solenoid 4 to be broken. This causes the shift ring 2 of the pilot pump 1 to be returned to neutral by the action of the centering springs 12 and 13. The apparatus is now in condition for the repetition of another cycle by the momentary manual closing of the start switch 42. Should it be desired at any time to stop the motion of the platen 34, the operator will manually open the emergency stop switch 55, thus breaking the circuit through solenoid 41 or 50 and shifting the pilot pump to neutral.

Relief is allowed in conduits 14 and 15 for shifting of the piston 20 to neutral by means of the modified shuttle valve 9 whose operation is as follows. The establishment of liquid under pressure in conduit 11 causes the valve member 25 thereof to move rightwardly, compressing spring 28 and allowing free communication between conduits 8 and 10. Similarly, the building up of liquid pressure in conduit 10 causes the valve member 25 to move leftwardly, compressing spring 27 and allowing free communication between conduits 11 and 8, thereby likewise allowing the pump 1 to withdraw from tank 7 any additional liquid required to make up for leakage or because of the difference in effective areas of the two sides of the servomotor piston 20. Immediately upon the shifting of the pilot pump 1 to neutral, the pressure in the conduit 10 or 11 which was under pressure is lowered to that exerted by the spring 21 or 22 which was under compression. The centering springs 27 and 28 of the shuttle valve 9 move the valve member 25 to the medial position, thereby allowing free communication between conduits 10 and 11 and allowing relief of the servomotor piston 20 so that it is free to center the shift ring 18 of the main pump 17 under the influence of centering springs 21 and 22.

It will be understood that springs 27 and 28 may be very small and still effective to center the valve member 25 against the pressure in conduit 10 or 11 exerted by the main pump spring 21 or 22, respectively, through the piston 20, the effective areas of the piston heads of the valve member 25 being also proportioned to the effective area of shifting piston 20 to effect this result.

The shuttle valve 9 is designed to restrict the passage of fluid at the two ends thereof sufficiently so that when the pilot pump moves to full stroke in either direction, back pressure will build up in the pilot system to actuate the main pump servomotor.

From the foregoing, it will be seen that novel and highly effective means is provided for the control of the main pump 17 and that this means comprises double-acting means for shifting the ring of the pilot pump 1 and a double-acting servomotor 16, these elements cooperating in a novel manner with the other elements in the system to produce a new and more effective hydraulic control.

Figure 2:
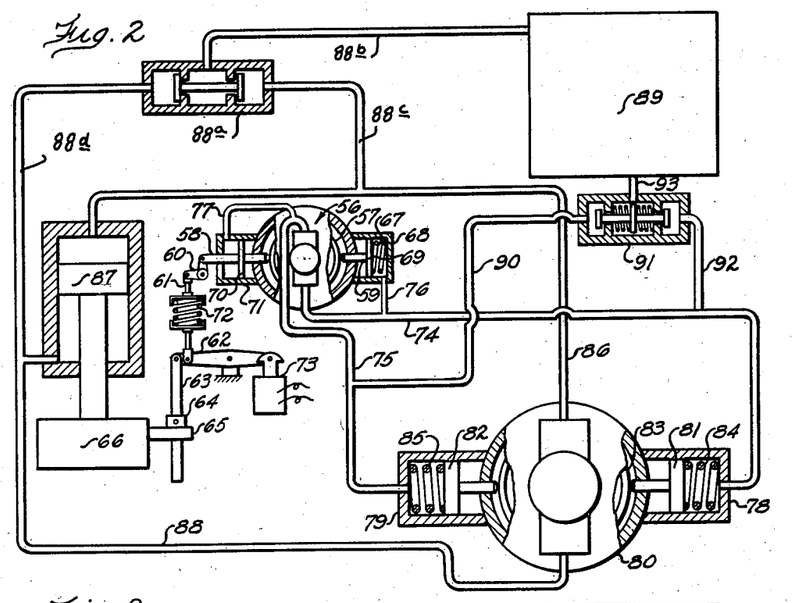
Fig. 2 is a diagrammatic view showing another mode in which the principles of the present invention may be applied, the reversible variable delivery pilot pump supplying its pressure to the servomotors of the main pump and being controlled by suitable mechanical and electrical mechanism.

*Modification shown in Figure 2*

In this figure, the pilot pump 56 has the shift ring 57 which is engaged by the shift rods 58 and 59, the shift rod 58 being connected by the bell crank 60 and the link 61 to a rocker arm 62, one end of which is adapted to be moved upwardly by a rod 63 upon which is adjustably fixed a collar 64 adapted to be engaged by a yoke 65 secured to the platen 66. Rocker arm 62 is adapted to be rocked by the platen 66 reaching its upward stroke in such direction as to shift the shift ring 57 rightwardly, thereby compressing the spring 67 in the cylinder 68 attached to the side of the pilot pump 56. The shift rod 59 carries a piston 69 which is adapted to compress the spring 67 and to be moved hydraulically as will presently appear. Similarly, the shift rod 58 carries a piston 70 operating within a hydraulic cylinder 71 in a manner which will presently appear. A spring 72 is interposed between halves of the link 61, this spring 72 being strong enough to overcome the spring 67 at the right of the pilot pump.

The collar 64 is so adjusted as to move the shift ring 57 of the pilot pump only to neutral when the platen 66 reaches its upper position. In order to shift the pump onto stroke in this same direction, a solenoid 73 is operatively connected to the rocker arm 62 and when the solenoid 73 is energized, it shifts the shift ring of the pilot pump against the action of spring 67 onto stroke in a direction such that the pump delivers into conduit 74 and sucks liquid from conduit 75. A conduit 76 connects conduit 74 to the cylinder 68 in such manner that when the pressure builds up in conduit 74, it is effective in conjunction with spring 67 to force the piston 69 leftwardly, thereby shifting the pump 56 towards neutral, this motion being taken up by the spring 72, whereby the armature of solenoid 73 and rocker arm 62 retain their position.

Similarly, a conduit 77 leads from the conduit 75 to the cylinder 71 so that when the pump is on stroke in the opposite direction, the pressure built up in conduit 75 after shifting of the main pump has been effected is transmitted to cylinder 71 and causes the piston 70 therein to shift the pump towards neutral from the other direction.

Spring 67 is of such strength as to normally move the shift ring 57 of the pilot pump 56 leftwardly so as to place the pilot pump on stroke in a direction such that it delivers into conduit 75.

Conduits 74 and 75 are connected respectively to servomotor cylinders 78 and 79 of a main pump 80. Hydraulic servomotor pistons 81 and 82 respectively are disposed in cylinders 78 and 79 and are adapted to move the shift ring 83 of the main pump. A pair of springs 84 and 85 normally tend to move the pistons 81 and 82 respectively inwardly towards the main pump, thereby effecting automatically a self-centering action, these springs being of equal strength.

The main pump 80 is adapted to deliver pressure liquid either to a conduit 86 and thence to the top of main piston 87 which actuates the platen 66 or to a conduit 88 to the bottom of piston 87, depending upon the position of its shift ring 83.

Conduit 75 is adapted to be placed into communication with the tank 89 by a conduit 90 leading to a modified shuttle valve 91, while conduit 74 is likewise adapted to be placed into communication with tank 89 by a conduit 92 leading to the other end of the shuttle valve 91. Shuttle valve 91 is constructed as is shuttle valve 9 in Fig. 1 and has its central chamber in communication with the tank 89 at all times by means of a conduit 93.

A shuttle valve 88a of conventional type has its central chamber connected to tank 89 by line 88b and its end chambers connected to the main pump lines 86 and 88 by conduits 88c and 88d, respectively.

*Operation of system of Figure 2*

With the parts in the position shown, if it is desired to effect downward movement of platen 66, the operator energizes solenoid 73, thus causing the shift ring 57 of pilot pump 56 to move rightwardly, causing liquid pressure to be built up in conduit 74. This causes the servomotor piston 81 to shift the shift ring 83 of the pump 80 leftwardly, causing liquid pressure to be built up in conduit 86 and to be thence transmitted to the upper side of the main piston 87. As soon as the piston 82 has moved leftwardly to effect this shifting from the neutral position, liquid pressure built up in conduit 74 will act through conduit 76 to move the piston 69 of the pilot pump leftwardly, causing compression of spring 72. This will shift the pilot pump 56 towards neutral. However, it will not entirely reach neutral because there is always some leakage in the system and the pump 56 is therefore always slightly on stroke. This stroking maintains sufficient pressure to keep the valve member in shuttle valve 91 shifted leftwardly, whereby communication between conduits 74 and 75 is prevented.

When the platen 66 reaches its downward position, suitable means is operated for de-energizing the solenoid 73 whereupon the spring 67 forces the shift ring 57 of the pilot pump 56 all of the way to the left, thereby putting the pump 56 on stroke in the opposite direction. This causes liquid under pressure to be delivered into conduit 75 and causes liquid to be withdrawn from the conduit 74. This causes the servomotor piston 82 to move rightwardly, moving the shift ring 83 of the main pump and causing the main pump to deliver liquid under pressure into conduit 88, causing the platen 66 to move upwardly. As soon as the piston 82 has moved rightwardly as far as possible, pressure is built up in conduit 75 which is transmitted through conduit 77 to the left-hand of piston 70, causing piston 70 to shift the shift ring 57 of the pilot pump 56 towards neutral. Again the shift ring will not completely reach neutral because of slight leakage in the system whereby the pump is always slightly on stroke and again maintains sufficient pressure in conduit 75 to hold the valve member of shuttle valve 91 rightwardly, thereby preventing communication between conduits 74 and 75.

As the platen 66 reaches its uppermost position, its yoke 65 engages the collar 64 and causes the shift ring 57 of the pilot pump 56 to be positively moved to the exactly central or neutral position. Immediately when the pilot pump is shifted to neutral by this outside means, the pressure in the outlet side 75 drops to that exerted in line 75 by the servomotor spring 84 which is now compressed. There is always some slight leakage and the smallest leakage is sufficient to immediately lower the pressure in the outlet conduit 75 to this figure. The spring of shuttle valve 91 now moves the shuttle valve member to the central position, allowing a free communication between conduits 74 and 75, thus allowing the springs 84 and 85 to center the shift ring 83 of the main pump 80 and thus to position and maintain the main pump accurately in neutral, whereby falling of the platen 66 is prevented since the pump 80 is prevented from acting as a motor. Due to the great difference in areas between the piston 82 and the left-hand piston of the shuttle valve 91, a much smaller spring in the shuttle valve is enabled to shift the shuttle valve member against the pressure in line 75 exerted by the spring 84.

Figure 3:
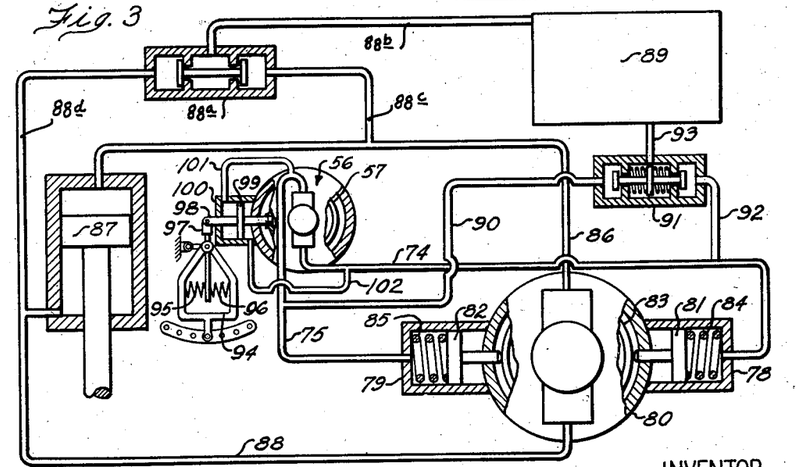
Fig. 3 is a diagrammatic view along the lines of Fig. 2 but showing a modification therefrom in that the pilot pump is manually controlled.

*Modification of Figure 3*

In Figure 3, there is shown a modified form which differs from Figure 2 only in that the control of the pilot pump 56 is changed so as to be manual by the elimination of the means for electrically shifting the pilot pump and the means for shifting the pilot pump to neutral when the platen 66 has returned to its uppermost position. Instead, the pilot pump 56 is shifted manually by means of a pivoted manually operated lever 94 which operates by means of springs 95 and 96 a lever 97 which is directly connected to the shift rod 98 which is threadedly received in the shift ring 57 of the pump 56 and which carries a double-acting piston 99 operating within the cylinder 100. The outlet conduit 75 is connected by a conduit 101 so that when pressure is built up in conduit 75 after a shifting of the main pump, the piston 99 will be moved rightwardly. Similarly, a conduit 102 connects the conduit 74 to the other side of piston 99 so that when pressure is built up in conduit 74 the piston 99 will be moved leftwardly.

In operation, the operator first moves manual lever 94 to the desired position leftwardly, thus causing the shift ring 57 to be moved rightwardly and causing the application of liquid under pressure to the right hand servomotor of the main pump 80, this causing a delivery of liquid to the top of the main piston 87. After the shifting operation, the building up of liquid pressure in conduit 74 moves piston 99 leftwardly against the action of spring 96, thereby moving the shift ring 57 towards neutral. After the pressing operation, the operator moves the lever 94 in the opposite direction, whereupon the shift ring 57 is shifted leftwardly, whereupon liquid under pressure is delivered to the left-hand servomotor of main pump 80, whereupon main pump 80 is shifted so as to deliver liquid under pressure to conduit 88, thereby effecting return of the pressing piston 87. As soon as the servomotor shifting has been accomplished, the building up of liquid pressure in conduit 75 causes piston 99 to move rightwardly against the action of spring 95, thereby causing the pump to be shifted towards neutral. When the return of the piston 87 has been accomplished, the operator will move the lever 94 to the neutral position, whereupon the shift ring 57 is moved to neutral and the shuttle valve 91 operates so as to establish fluid communication between conduits 74 and 75 and to allow the shift ring 83 of main pump 80 to be centered under the action of the centering springs 84 and 85. By setting the lever 94 at the desired position, a variation in the speed of shifting the main pump 80 can be effected.

Figure 4:
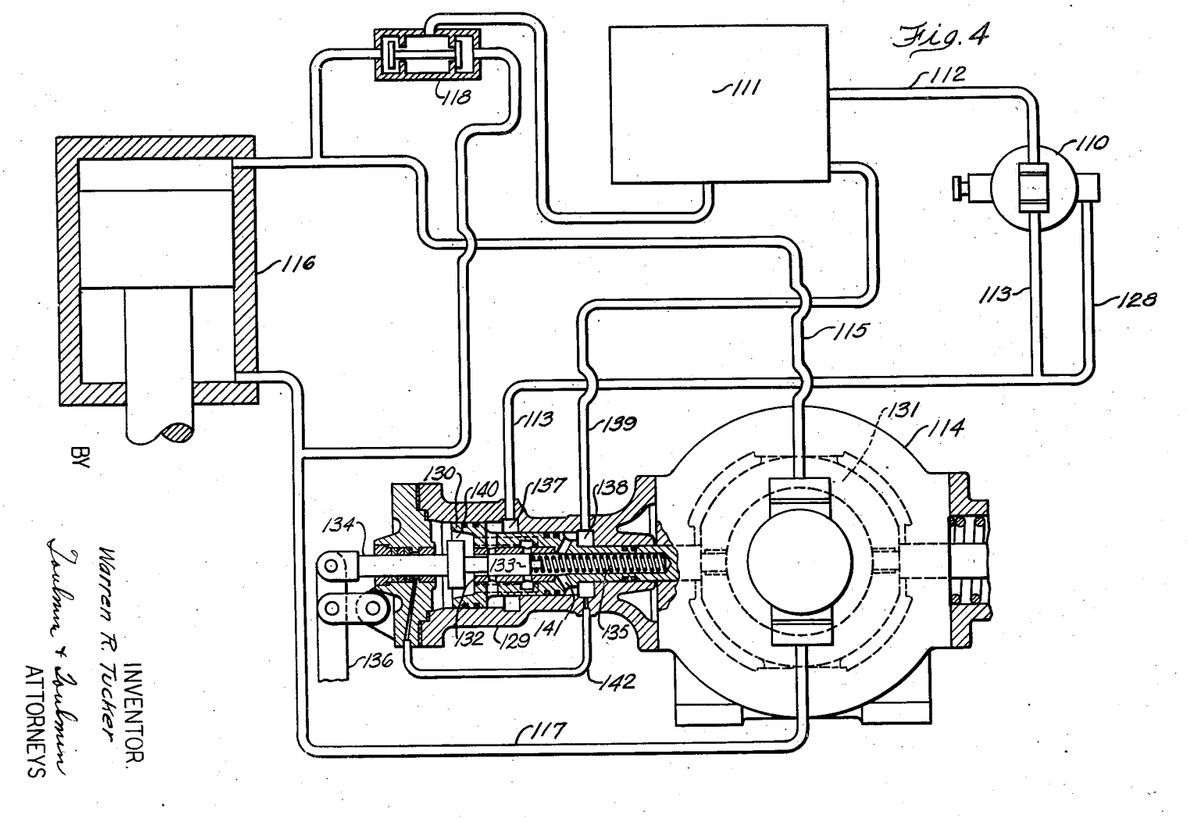
Fig. 4 is a diagrammatic view of still another modification wherein a one-way variable delivery pilot pump actuates a two-way variable delivery main pump.

*Modification shown in Figure 4*

In Fig. 4, there is illustrated the application of the principles of the present invention to a situation where a one-way variable delivery pump is utilized. The pilot pump 110 is adapted to withdraw liquid from tank 111 by means of the conduit 112 and to deliver liquid into the conduit 113 which leads to the servomotor control of a main pump 114. The main pump 114 is adapted to deliver liquid under pressure either to a conduit 115 and thence to the top of a main hydraulic motor 116 or to a conduit 117 and thence to the bottom of hydraulic motor 116. As before, a shuttle valve 118 of the conventional type is provided between the tank 111 and conduits 115 and 117.

Figure 5:
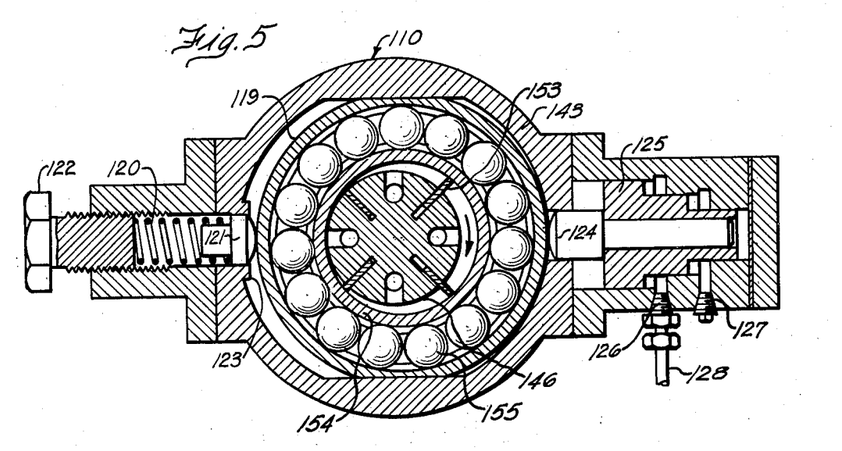
Fig. 5 is a transverse section on the line 5—5 of Fig. 6 of a one-way variable delivery pilot pump such as is utilized in Fig. 4; with proper modification of the stop means, this pump can be converted to a reversible variable delivery pump and in such case would be applicable to the circuits shown in Figs. 1 to 3.

As is more fully indicated in Fig. 5, the pilot pump 110 has a shift ring 119 which is adapted to be moved normally to the right to full stroke by a spring 120 which pushes against a shift member 121 engaging the shift ring 119. The spring 120 is adapted to have its force varied by the adjusting screw 122.

In order to shift the pump 110 to neutral, the shift ring 119 is moved leftwardly of Fig. 5 until its shift ring 119 engages the boss 123 at the left which surrounds the member 121 and which is adapted to act as a stop for shift ring 119 in the neutral position. The shift member 124 is adapted to be moved leftwardly by the stepped hydraulic piston 125. In order to actuate piston 125, a series of ports 126 and 127 corresponding in number to the number of steps is provided, only the desired port being used. As shown, the pressure built up in conduit 113 is adapted to be transmitted after a shifting of the pump 114 by means of a conduit 128 to the port 126 and to thereby act upon the large diameter annular portion of piston 125. If it is desired to actuate the ring 119 at a higher line pressure, the plug in port 127 may be removed and conduit 128 led into port 127. If it is desired to actuate shift ring 119 at a lower line pressure, conduit 128 may be branched and led into both ports 126 and 127.

The servomotor control for main pump 114 indicated at the left thereof is shown specifically in the copending application of Walter Ernst, Serial No. 170,250, filed October 21, 1937, which has matured to Patent No. 2,184,665. This servomotor control, therefore, does not per se constitute any part of the present invention. As shown, the servomotor control comprises a stepped servomotor cylinder 129 in which is slidably mounted a stepped piston 130 which is fixedly connected at its rightward end to the shift ring 131 as by means of threading thereinto. Fixedly carried by the piston 130 is a sleeve 132 which is adapted to slidably engage a valving member 133 in the form of an enlarged cylindrical portion of a servomotor control rod 134. A spring 135 normally urges the rod 134 outwardly and rod 134 is adapted to be reciprocated by the lever 136. The pressure inlet 113 connects with an annular zone 137 and a similar annular zone 138 is in connection with a conduit 139 which leads from the servomotor cylinder 139 back to the tank 111. Suitable bores are provided in the piston 130 and in the sleeve 132 whereby when the control rod 134 is moved rightwardly, liquid under pressure from conduit 113 is admitted to the annular space 137, thence through radial bores in the piston 130 and in the sleeve 132 to a space 140 behind the piston 130 whereby this pressure liquid is adapted to move the piston 130 inwardly, thereby shifting shift ring 131 until the valve member 133 seals the left-hand ports in sleeve 132. This causes pump 114 to deliver liquid either to conduit 115 or to conduit 117. When it is desired to shift the ring 131 in the opposite direction, the lever 136 is oppositely actuated, moving the control rod 134 leftwardly, sealing the left-hand ports in the sleeve 132 and causing pressure liquid to be applied to the largest stepped portion of piston 130 directly from the annular zone 137. As the piston 130 moves leftwardly in response to this pressure, the liquid from zone 140 is discharged through axial ports shown in dotted lines to the rightward radial ports to sleeve 132, thence into the chamber accommodating spring 135, thence outwardly through inclined ports 141 in the piston 130, thence to the annular zone 138 to the return conduit 139. This leftward motion of piston 130 continues until it has caused the rightward ports of sleeve 132 to be sealed by their engagement with the valve member 133.

The conduit 142 is provided solely to take care of leakage along the rod 134.

In order to effect operation of the mechanism shown in Fig. 4, the pump 110 is continuously operated and shifting of shift ring 131 is effected by manual or automatic operation of lever 136 so as to cause the servomotor piston 130 to move either to the right or to the left. Immediately upon the shift ring 131 attaining its position to the right or to the left, pressure will be built up in conduit 113 and will be transmitted through conduit 128 to act upon the piston 125 of the pilot pump 110 and to shift the ring 119 thereof towards neutral. Should any leakage occur in the servomotor control, the pressure in conduit 128 will diminish and pilot pump 110 will be immediately placed on stroke to the necessary extent under the action of spring 120.

After a pressing in one direction has been effected, lever 136 will be operated in the reverse direction, whereupon hydraulic motor 116 will be operated so as to retract its ram.

Pilot pump construction

Figure 6:
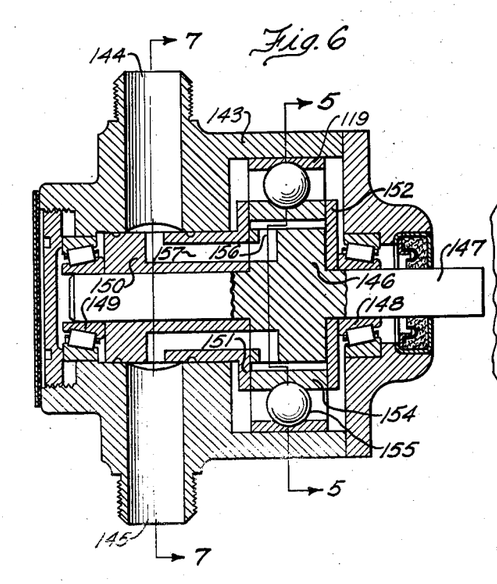
Fig. 6 is a longitudinal section of the pump of Fig. 5.
Figure 7:
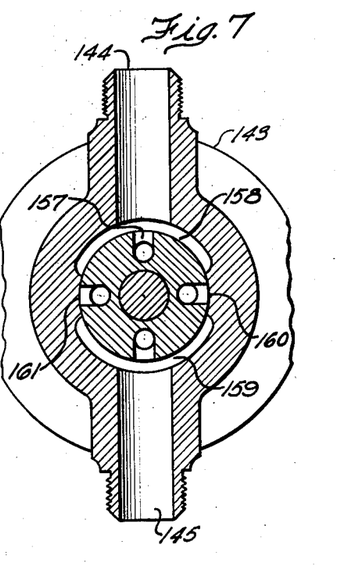
Fig. 7 is a transverse section of the pump of Fig. 5 taken on the line 7—7 of Fig. 6, looking in the direction of the arrows.

As indicated in Figs. 5 to 7, the pilot pump 110 comprises a housing 143 which is provided with passageways 144 and 145 of which passageway 144 is the inlet passageway connected to conduit 112 and passageway 145 is the outlet passageway connected to conduit 113. The pump comprises a rotor 146 integral with a shaft 147 which is journaled in the housing by means of bearings 148 and 149. Fixedly mounted on the shaft 147 is a distributing sleeve 150 which has an integral flange 151 forming the left side wall of the rotor. A side wall 152 is fixedly mounted as by shrinking on the other side of rotor 146. Slidably mounted in the rotor 146 are vanes 153 which are adapted to carry with them a rotatable cylindrical ring 154 which functions as the inner race of a ball bearing which comprises the balls 155 and the outer race 119 which functions as the shift ring of the pump. The rotor is provided with the ports 156 which extend inwardly from working chambers thus formed and thence to the side of the rotor. Distributing sleeve 150 is likewise provided with ports 157 which extend axially from communication with the ports 156 and thence radially outwardly. In order to valve the working chambers of the pump and to separate the pressure side of the pump from the suction side, the annular collecting space 158 is provided at the top of the sleeve 150 in the housing 143 and a similar annular collecting zone 159 is provided at the bottom, these zones being separated by the curved protuberances 160 and 161 which are of a peripheral length greater than the width of ports 157.

Thus, as the rotor 146 is rotated, the vanes 153 carry the ring 154 with them and valving and porting of the chambers is accomplished by the collecting zones 158 and 159 and the division portions 160 and 161. It will be seen that, assuming clockwise rotation of the rotor in Fig. 5, the upper working chambers become suction chambers and suck liquid from inlet 144 while the lower chambers become pressure chambers and force the liquid under pressure into passageway 145. It will further be seen that by shifting the shift ring 119 transversely, the eccentricity of the ring 154 relative to the rotor 146 may be varied and that the delivery of the pump may thus be varied. When the ring 154 is concentric with the rotor 146, the pump is in neutral and no delivery is made. This happens when the ring 119 is in engagement with the boss 123 which acts as a stop for the ring.

Figure 8:
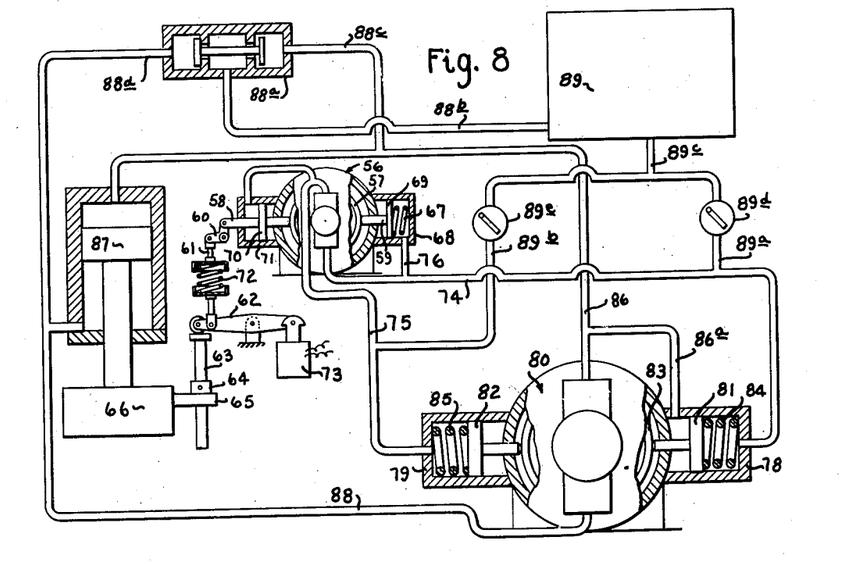
Fig. 8 is a diagrammatic view of a still further modification, which may be termed a modification of Fig. 2 in that the shuttle valve of the pilot pump circuit of Fig. 2 has been eliminated and use is made of the fact that the main pump does not shift to neutral when the pilot pump is positively moved to neutral by the return of the platen; another difference is that provision for self-shifting the main pump towards neutral in response to working pressure so that that pressure can be held indefinitely.

Modification of Figure 8

In Fig. 8, there is portrayed diagrammatically a modification of the arrangement of Fig. 2. The pilot pump shuttle valve has been eliminated and conduits 74 and 75 are connected by conduits 89a and 89b to a conduit 89c which leads to the tank 89. Check valves 89d and 89e are disposed in conduits 89a and 89b, these check valves being adapted to allow liquid to be sucked from tank 89 into conduit 74 or 75 for make-up purposes to compensate for leakage, but to prevent the reverse flow. A further difference from the construction of Fig. 2 resides in the provision of a conduit 86a leading from the upper outlet conduit 86 of pump 80 to the right-hand servomotor cylinder 78 at a point leftwardly of the piston 81.

The arrangement of Fig. 8 operates in a manner generally similar to that of Fig. 2, but reliance is placed upon the fact that the main pump 80 does not shift to neutral when the pilot pump 56 is positively moved to neutral by the return of the platen 66 to its upper position. On the contrary, main pump 80 continues to deliver liquid under pressure into the conduit 88 and causes the platen 66 to travel slightly beyond the position required to shift the pilot pump 66 to neutral. This overtravel of platen 66 is transmitted through the rocker arm 62, the link 61, the spring 72, and the bell crank 60 to the shift rod 58, causing the pilot pump 56 to be shifted slightly on stroke in a direction such as to deliver liquid into conduit 74, thereby causing the main pump 80 to be shifted to neutral. In fact, the main pump 80 will be shifted somewhat past neutral causing liquid to be delivered into conduit 86 and causing the platen 66 to move downward slightly, this causing the pilot pump 56 to be shifted slightly on stroke in a direction such as to deliver liquid into conduit 75, causing main pump 80 to be again shifted slightly onto stroke in a direction such as to deliver liquid into conduit 88, thereby causing the platen 66 to again move upwardly slightly. Thus, in this arrangement, the platen 66 will hunt back and forth for a short period of time until main pump 80 and pilot pump 56 are both in neutral. Should the platen 66 drop slightly due to leakage, it will cause the pilot pump 56 to be placed on stroke in such direction as to deliver liquid into conduit 75, thereby causing the main pump 80 to be shifted slightly onto stroke so as to deliver liquid into conduit 88, thereby causing the platen 66 to be elevated again.

The provision of conduit 86a causes the main pump to shift itself towards neutral in response to the development of working pressure in the conduit 86, this working pressure being transmitted through conduit 86a so as to shift the shift ring of the main pump 80 rightwardly and towards neutral. As the pressure is built up on the left-hand side of piston 81, it moves piston 81 rightwardly, thereby forcing the liquid on the right-hand of piston 81 into conduit 74 and thence through conduit 76 into the chamber at the right-hand of control piston 69 of the pilot pump. The pilot pump was already almost at neutral and this application of pressure will cause piston 69 to shift pump 56 to neutral and then onto stroke in the other direction so as to suck liquid from conduit 74 and deliver it to conduit 75, thus aiding in the shifting of the main pump 80 to neutral. The shift ring 83 will be shifted to just that point where pump 80 is operative to maintain the working pressure in conduit 86, and will not go any further than this because any drop in pressure in line 86 below the working pressure attendant upon such further travel of shift ring 83 too far towards neutral would cause piston 81 to be moved leftwardly which would allow compressed spring 72 to shift pilot pump 56 onto stroke so as to deliver liquid under pressure into conduit 74. Thus main pump 80 will deliver into conduit 86 indefinitely liquid under the working pressure so that the working pressure may be held indefinitely on the material or article being pressed.

Figure 9:
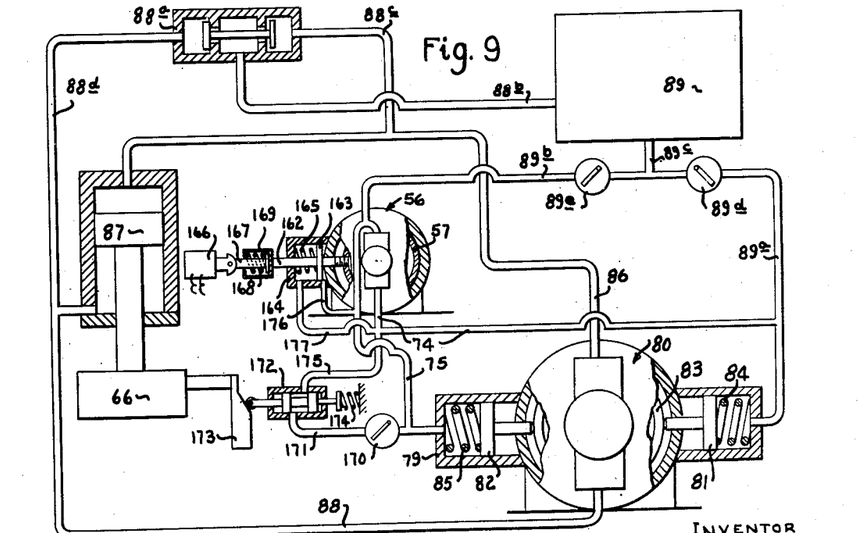
Fig. 9 is a similar view of a still further modification wherein the shuttle valve of the pilot pump circuit is eliminated and a platen-actuated two-way valve is substituted; in this modification the pilot pump is held on stroke continuously and is never positively moved to neutral.

*Modification of Figure 9*

In Fig. 9, the construction is generally similar to that of Fig. 8 but the provision for self-shifting of the main pump towards neutral in the form of conduit 86a has been eliminated and the control of the pilot pump is modified. The pilot pump is adapted to have its shift ring 57 shifted by a shift rod 162 which has an integral piston 163 slidably operating in a control cylinder 164, a spring 165 bearing against the piston 163 and normally urging the shift ring 57 rightwardly so as to place the pump on stroke in such direction as to normally deliver liquid into conduit 75 whence it passes to the left-hand servo-motor cylinder 79 of the main pump 80 and is adapted to move the shift ring 83 thereof rightwardly so as to move the platen 66 upwardly. A solenoid 166 has its armature connected to a rod 167. A spring 168 is provided between a housing 169 therefor fixedly carried by shift rod 162 and a collar integral with the end of rod 167. When the solenoid 166 is energized, it pulls the rod 167 leftwardly and thereby through the spring 168, pulls the shift rod 162 leftwardly and the shift ring 57 leftwardly so as to place the pilot pump 56 on stroke in the opposite direction in which it delivers liquid into conduit 74 whence the liquid under pressure passes to the rightward servomotor cylinder 78 and causes main pump 80 to be placed on stroke in such direction as to deliver liquid under pressure into conduit 86, thereby causing platen 66 to move downwardly for a pressing operation. As the parts are shown, the solenoid 166 is de-energized and the pump 56 is delivering liquid into conduit 75, thence through a check valve 170, line 171, thence through a then open two-way valve 172 which is held open by the cam 173 carried by the platen 66 against the action of a spring 174, and thence by way of a conduit 175 to conduit 74 and back to the pump 56. When the solenoid 166 is energized so as to shift the pump 56 onto stroke in the other direction so as to cause a pressing operation, the liquid from conduit 74 is prevented from traveling in a reverse circuit by the check valve 170 which closes and causes the pressure developed in conduit 74 to be effectively applied to the right-hand servomotor piston 81, thereby causing the main pump 80 to be shifted so as to deliver pressure liquid into conduit 86, thereby causing platen 66 to begin lowering. As soon as the platen 66 starts downwardly, the cam 173 causes the valve 172 to be closed under the thrust of spring 174 preparatory to a reversal operation. Since valve 172 is closed when the platen 66 reaches the limit of its downward travel and it is desired to cause it to move upwardly, when the solenoid 166 is de-energized for a retraction stroke of platen 66, the shift ring 57 assumes the position shown in Fig. 9 and pump 56 delivers liquid into conduit 75 and thence effectively against servomotor piston 82, thereby shifting main pump 80 so as to cause it to deliver liquid under pressure into conduit 88, thereby causing platen 66 to lift.

When platen 66 reaches its uppermost position, cam 173 causes valve 172 to be opened, thereby allowing the liquid under pressure at the left-hand of servomotor piston 82 to pass outwardly through check valve 170, line 171, open valve 172, line 175, and conduit 74 to the right-hand of servomotor piston 81, thus equalizing the pressures on pistons 81 and 82 and thus allowing the springs 84 and 85 to move the shift ring 83 of the main pump 80 to neutral.

With the platen thus elevated and the main pump 80 in neutral, should platen 66 drop for any cause, as for example due to leakage below piston 87, its cam 173 will cause valve 172 to partially close under the influence of spring 174, causing a restriction and causing the liquid being supplied into conduit 75 to begin to be applied against servomotor piston 82 so as to cause slight shifting of main pump 80 in a direction such as to place pump 80 on stroke, delivering liquid into conduit 88 and causing elevation of platen 66.

As before, means is provided for shifting the pilot pump 56 towards neutral from delivery in either direction after it has caused shifting of the main pump onto stroke in either direction. This means as before, takes the form of conduit 176 transmitting the liquid pressure from conduit 75 to the right hand of piston 163 and conduit 177 transmitting the liquid pressure in conduit 74 to the left-hand of piston 163. These control conduits 176 and 177 function as follows:

Assuming that a pressing operation is being initiated, solenoid 166 is energized, causing the shift ring 57 to be moved leftwardly against the action of spring 165 and causing liquid pressure to be built up in conduit 74, causing main pump 80 to be shifted so as to deliver in conduit 86. When main pump 80 has been shifted by this liquid pressure, liquid pressure in conduit 74 builds up very rapidly and is transmitted through conduit 177 to the left-hand of piston 163, thereby shifting the ring 57 of the pilot pump rightwardly towards neutral against the action of spring 169. Similarly, at the bottom of the stroke of platen 66 when it is desired to lift platen 66, solenoid 166 is de-energized, causing the shift ring 57 to move rightwardly under the influence of spring 165 and causing liquid under pressure to be built up in conduit 75 and applied so as to shift the ring 83 of main pump 80 rightwardly so as to deliver liquid into conduit 88. After this shifting has been accomplished, the still further build-up of liquid pressure in conduit 75 is transmitted through conduit 176 to the right-hand of control piston 163, thereby shifting the ring 57 of the pilot pump leftwardly towards neutral in opposition to the spring 165.

Provision is desirably made for adjusting the upward or idling point of the press, by providing for the vertical positioning or adjustment of the cam 173 in any desired manner. This is possible because cam 173 causes opening of valve 172 and thus causes the press to stop at the point where it effects this opening of valve 172. In this way, adjustment is provided for differing conditions of operation.

From the foregoing description, it will be seen that the present invention provides for simplification and increased operating efficiency of hydraulic circuits which have hitherto employed a constant delivery pilot pump. These results are brought about in large measure by the use of a variable delivery pilot pump. In addition to the advantages referred to in detail above, numerous other advantages of the present invention will immediately be apparent to those skilled in the art and it is not deemed necessary to detail them at length here.

It will further be seen that the use of a variable reversible flow pilot pump makes possible considerable simplification of the press control system. The main radial pump control may be, as illustrated, a simple double-acting hydraulic piston without the complicated servomotor control shown for the main pump in Fig. 4. The invention permits a simplified control for the variable reversible delivery pilot pump. Due to the fact that the forces involved in shifting the pilot pump are relatively small, the linkage for reversing the pilot pump may be connected mechanically directly to the pilot pump shifting ring without an intervening hydraulic servomotor control. In addition, as illustrated, means such as a relatively simple spring and plunger arrangement may be provided for regulating the pilot pressure by utilizing the variable stroke feature of the pilot pump.

I wish it to be understood that I intend to include as within the invention such modifications and adaptations thereof as may be necessary to adapt it to varying conditions and uses and as fall within the scope of the appended claims.

Having thus fully described my invention, what I claim as new and desire to secure by Letters Patent is:

1. A hydraulic system comprising in combination a hydraulic plunger, a reversible variable delivery main pump to supply pressure fluid to said plunger to actuate the same, double-acting servomotor means associated with said main pump for varying and reversing the delivery thereof, a reversible variable delivery pilot pump, for supplying pressure fluid to said servomotor means to actuate the latter, means responsive to the pressure condition in said servomotor means for reducing the delivery of said pilot pump without affecting the delivery of said main pump, yielding means continuously urging said main pump to neutral or no delivery position, and means adapted at the end of the retraction stroke of said plunger to make said servomotor means ineffective, thereby allowing said yielding means to move said main pump to neutral position.

2. A hydraulic system comprising a hydraulically reciprocable plunger, a variable delivery main pump for supplying pressure fluid to said plunger to actuate the same, a servomotor means associated with said pump for controlling the delivery thereof, a reversible variable delivery pilot pump, means for connecting the output of said pilot pump to said servomotor means to actuate said servomotor means, servomotor means including a double-acting fluid operable piston for said pilot pump, means for connecting the output of said pilot pump selectively to one or the other side of said piston, to move said pilot pump towards neutral delivery position in response to a predetermined pressure in said first-named servomotor means, and means for short circuiting the output of said pilot pump in response to a predetermined point of travel of said plunger, to initiate movement of said main pump to substantially no delivery position.

3. In a hydraulic system, a hydraulic motor, a variable delivery main pump for supplying pressure fluid to said motor for actuating the same, servomotor means for controlling the delivery of said main pump, a variable delivery pilot pump, means for connecting the output of said pilot pump to said servomotor means, means for shifting said pilot pump to neutral, means operatively connected with said motor for shifting said pilot pump to substantially no-delivery position, and means for automatically shifting said main pump to neutral when said pilot pump is shifted to neutral.

4. In a hydraulic system, a hydraulic motor, a reversible variable delivery main pump for supplying pressure fluid to said motor for actuating the same, servomotor means for controlling the delivery of said main pump, a variable delivery pilot pump, means for hydraulically connecting said pilot pump to said servomotor means, means operatively connected with said motor for shifting said pilot pump to neutral, and means for automatically shifting said main pump to neutral when said pilot pump is shifted to neutral comprising self-centering spring means associated with said servomotor means for normally urging said main pump to neutral and hydraulic means for relieving said servomotor means when said pilot pump is shifted to neutral for thereby allowing said spring means to freely center and shift said main pump to neutral.

5. In a hydraulic system, a hydraulic motor, a reversible variable delivery main pump for supplying pressure fluid to said motor for actuating the same, servomotor means for controlling the delivery of said main pump, a reversible variable delivery pilot pump, means for connecting said pilot pump to said servomotor means to oppositely actuate the same so as to cause said main pump to oppositely deliver, external means for shifting said pilot pump so as to deliver in either direction, spring means for shifting said pilot pump to neutral when said external means is rendered inoperative, and spring means for shifting said main pump to neutral when said pilot pump is shifted to neutral.

6. In a hydraulic system, a hydraulic motor, a reversible variable delivery main pump for supplying pressure fluid to said motor for actuating the same, shift means therefor for controlling the delivery thereof, double-acting servomotor means for controlling said shift means, said servomotor means comprising a reciprocable piston operatively connected to said shift means and a cylinder for said piston, said cylinder having a pair of ports normally disposed on each side of said piston, a reversible variable delivery pilot pump, and a pair of conduits connecting said pilot pump to said ports, whereby the output of said pilot pump is adapted to move said piston and thereby said shift means until said piston uncovers the one of said ports which is connected to the return one of said conduits and to maintain said piston in said position.

7. In a hydraulic system a fluid operable motor, a reversible variable delivery main pump for supplying pressure fluid to said motor for actuating the same, double-acting servomotor means for controlling the delivery of said main pump, a reversible variable delivery pilot pump, double-acting servomotor means for controlling the delivery thereof, a pair of conduits connecting said pilot pump oppositely to said main servomotor means, a pair of conduits connecting said pilot pump oppositely to said pilot servomotor means, external means adapted to be manually operated for overcoming said pilot servomotor means and additionally controlling the delivery of said pilot pump, and yielding means for allowing said pilot pump to be shifted towards neutral without changing the setting of said external means after said pilot pump has caused shifting of said main pump.

8. In a hydraulic system a fluid operable motor, a reversible variable delivery main pump for supplying pressure fluid to said motor for actuating the same, double-acting servomotor means for controlling the delivery of said main pump, a reversible variable delivery pilot pump, double-acting servomotor means for controlling the delivery thereof, a pair of conduits connecting said pilot pump oppositely to said main servomotor means, a pair of conduits connecting said pilot pump oppositely to said pilot servomotor means, external means adapted to be manually operated for overcoming said pilot servomotor means and additionally controlling the delivery of said pilot pump, yielding means for allowing said pilot pump to be shifted towards neutral without changing the setting of said external means after said pilot pump has caused shifting of said main pump, means for normally urging said main pump to neutral, and means for allowing said last-named means to shift said main pump to neutral when said pilot pump has been shifted to neutral by said external means.

9. In a hydraulic system a fluid operable motor, a variable delivery main pump for supplying pressure fluid to said motor for actuating the same, servomotor means for controlling the delivery of said main pump, a one-way variable delivery pilot pump, and conduit means connecting the output of said pilot pump to said servomotor means, whereby said pilot pump is operative to actuate said servomotor means to control the delivery of said main pump.

10. In a hydraulic system a fluid operable motor, a variable delivery main pump for supplying pressure fluid to said motor for actuating the same, servomotor means for shifting said main pump to stroke, a one-way variable delivery pilot pump, servomotor means for shifting said pilot pump towards neutral, and conduit means for connecting the output of said pilot pump to both of said servomotor means.

11. In a hydraulic system a fluid operable motor, a variable delivery main pump for supplying pressure fluid to said motor for actuating the same, servomotor means for shifting said main pump to stroke, a one-way variable delivery pilot pump, means normally urging said pilot pump to stroke, servomotor means for shifting said pilot pump towards neutral, and conduit means for connecting the output of said pilot pump to both of said servomotor means.

12. A hydraulic system comprising a hydraulically operable plunger, a reversible variable delivery main pump to supply pressure fluid to said plunger for reciprocating the same, double-acting servomotor means associated with said main pump to selectively move said main pump in one or the other direction, a reversible variable delivery pilot pump for supplying pressure fluid to said servomotor means, a pair of conduits connecting said pilot pump to said servomotor means, means operable in response to the travel of said plunger for preventing intercommunication between said conduits during a predetermined period of operation of said plunger, or establishing free communication between said conduits at the end of the retraction stroke of said plunger.

13. In a hydraulic system, a hydraulic motor, a variable delivery main pump for supplying pressure fluid to said motor to actuate the same, servomotor means associated with said main pump for controlling the delivery thereof, a variable delivery pilot pump adapted to supply pressure fluid to said servomotor means for actuating the latter, pressure responsive means for moving said pilot pump to a restricted delivery position in response to a predetermined pressure in said servomotor means, lever means operable to shift said pilot pump in one direction into full stroke position, and means interconnecting said lever means and said pilot pump and adapted to allow movement of said pilot pump from said full stroke position to a restricted stroke position without affecting the position of said lever means.

14. In a hydraulic system, a hydraulic motor, a reversible variable delivery main pump for supplying pressure fluid to said motor to actuate the same, servomotor means associated with said main pump for controlling the delivery thereof, a variable delivery pilot pump adapted to supply pressure fluid to said servomotor means for actuating the latter, pressure responsive means for moving said pilot pump to a restricted delivery position in response to a predetermined pressure in said servomotor means, solenoid means operable to move said pilot pump in one direction into full stroke forward delivery position, means associated with said pilot pump for moving the same in the opposite direction into full stroke retraction position, and yielding means interconnecting said solenoid means and said pilot pump and adapted to allow movement of said pilot pump from full stroke forward delivery position to a restricted forward delivery position without affecting the setting of said solenoid means.

15. A hydraulic system comprising a hydraulically reciprocable plunger, a reversible variable delivery main pump for supplying pressure fluid to said plunger to actuate the same, first servomotor means associated with said main pump and including two oppositely effective fluid chambers for controlling the delivery of said main pump, first yielding means urging said main pump to neutral or substantially no delivery position, a reversible variable delivery pilot pump operable selectively to supply pressure fluid to one or the other of said chambers, second yielding means continuously urging said pilot pump on stroke in one direction, actuating means for shifting said pilot pump on stroke in the opposite direction, against the thrust of said second yielding means, second servomotor means associated with said pilot pump and including a double-acting fluid operable piston for controlling the delivery of said pilot pump, said double-acting piston being adapted in response to a predetermined pressure condition in said first servomotor means to move said pilot pump toward neutral position, and means responsive to a predetermined point of travel of said plunger for hydraulically interconnecting said two chambers.

WARREN R. TUCKER.